(12) United States Patent
Hatakeyama

(10) Patent No.: US 11,641,516 B2
(45) Date of Patent: May 2, 2023

(54) LENS APPARATUS AND IMAGING APPARATUS

(71) Applicant: CANON KABUSHIKI KAISHA, Tokyo (JP)

(72) Inventor: Yasuhiro Hatakeyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 17/011,582

(22) Filed: Sep. 3, 2020

(65) Prior Publication Data

US 2021/0075957 A1  Mar. 11, 2021

(30) Foreign Application Priority Data

Sep. 10, 2019 (JP) .............................. JP2019-164298

(51) Int. Cl.
| | | |
|---|---|---|
| H04N 5/232 | (2006.01) | |
| G06F 3/041 | (2006.01) | |
| G02B 7/04 | (2021.01) | |
| G02B 7/10 | (2021.01) | |
| G03B 13/36 | (2021.01) | |
| G03B 5/00 | (2021.01) | |
| G02B 7/09 | (2021.01) | |

(52) U.S. Cl.
CPC .......... *H04N 5/23216* (2013.01); *G02B 7/04* (2013.01); *G02B 7/09* (2013.01); *G02B 7/10* (2013.01); *G03B 5/00* (2013.01); *G03B 13/36* (2013.01); *G06F 3/041* (2013.01); *H04N 5/232127* (2018.08); *G03B 2205/0046* (2013.01)

(58) Field of Classification Search
CPC ......... H04N 5/23216; H04N 5/232127; H04N 5/23209; H04N 5/23212; H04N 5/23296; G02B 7/04; G02B 7/09; G02B 7/10; G02B 7/102; G03B 5/00; G03B 13/36; G03B 2205/0046; G03B 17/02; G03B 3/10; G06F 3/041
See application file for complete search history.

(56) References Cited

U.S. PATENT DOCUMENTS

| | | | | |
|---|---|---|---|---|
| 2008/0296072 A1* | 12/2008 | Takashima | .............. | G06F 3/016 178/18.01 |
| 2010/0097198 A1* | 4/2010 | Suzuki | .................... | G06F 3/016 340/407.2 |
| 2011/0205038 A1* | 8/2011 | Drouin | .................. | G06F 3/0362 340/407.2 |
| 2013/0093937 A1* | 4/2013 | Kawai | ................ | H04N 5/23245 348/E5.045 |

(Continued)

FOREIGN PATENT DOCUMENTS

| | | | |
|---|---|---|---|
| JP | 2009-169266 A | | 7/2009 |
| JP | 2010020250 A | * | 1/2010 |

(Continued)

*Primary Examiner* — Abdelaaziz Tissire
(74) *Attorney, Agent, or Firm* — Canon U.S.A., Inc. I.P. Division

(57) ABSTRACT

A lens apparatus includes an exterior unit incorporating a lens unit, and an operation unit arranged on the exterior unit, on which a touch operation is performed to control at least one controlled unit. The operation unit has a round shape and includes a detection unit configured to detect a clockwise direction touch operation and a counterclockwise direction touch operation.

17 Claims, 13 Drawing Sheets

(56) References Cited

U.S. PATENT DOCUMENTS

| | | | |
|---|---|---|---|
| 2013/0249445 A1* | 9/2013 | Sumioka | H02N 2/008 318/116 |
| 2015/0138387 A1* | 5/2015 | Kokubu | G06F 3/016 348/222.1 |
| 2016/0150132 A1* | 5/2016 | Matsumoto | H04N 5/23216 348/373 |

FOREIGN PATENT DOCUMENTS

| | | | |
|---|---|---|---|
| JP | 2012215632 A | * | 11/2012 |
| JP | 2013-145944 A | | 7/2013 |
| JP | 2014-089280 A | | 5/2014 |

* cited by examiner

LENS APPARATUS AND IMAGING APPARATUS

BACKGROUND

Field

The present disclosure relates to a lens apparatus and an imaging apparatus.

Description of the Related Art

A technique discussed in Japanese Patent Application Laid-Open No. 2009-169266 provides a touch panel operable by a user on an interchangeable lens (a lens apparatus) attachable to a camera body. The interchangeable lens discussed in Japanese Patent Application Laid-Open No. 2009-169266 is provided with one or two rectangular-shaped touch panels extending in a circumferential direction. By operating the touch panel, a user performs focusing and other operations.

In the interchangeable lens discussed in Japanese Patent Application Laid-Open No. 2009-169266, a case is considered in which a user intends to increase a movement amount of a focus lens unit. The described focus lens unit is referred to as one or a plurality of lenses to be moved for focusing. In this case, for example, a user can touch an end portion of the touch panel with the user's finger and then move the finger to an end portion on an opposite side of the touch panel. In a case where the movement amount of the focus lens unit obtained by one movement of the finger from the end portion to the opposite end portion of the touch panel is less than a target amount, the user needs to remove the user's finger from the touch panel once and to repeat the operation. In other words, the interchangeable lens discussed in Japanese Patent Application Laid-Open No. 2009-169266 can increase an operation burden on a user.

SUMMARY

According to an aspect of the present disclosure, a lens apparatus includes an exterior unit incorporating a lens unit, and an operation unit arranged on the exterior unit, on which a touch operation is performed to control at least one controlled unit. The operation unit has a round shape and includes a detection unit configured to detect a clockwise direction touch operation and a counterclockwise direction touch operation.

Further features will become apparent from the following description of exemplary embodiments with reference to the attached drawings.

DESCRIPTION OF THE EMBODIMENTS (Configuration of Camera System)

Figure 1:
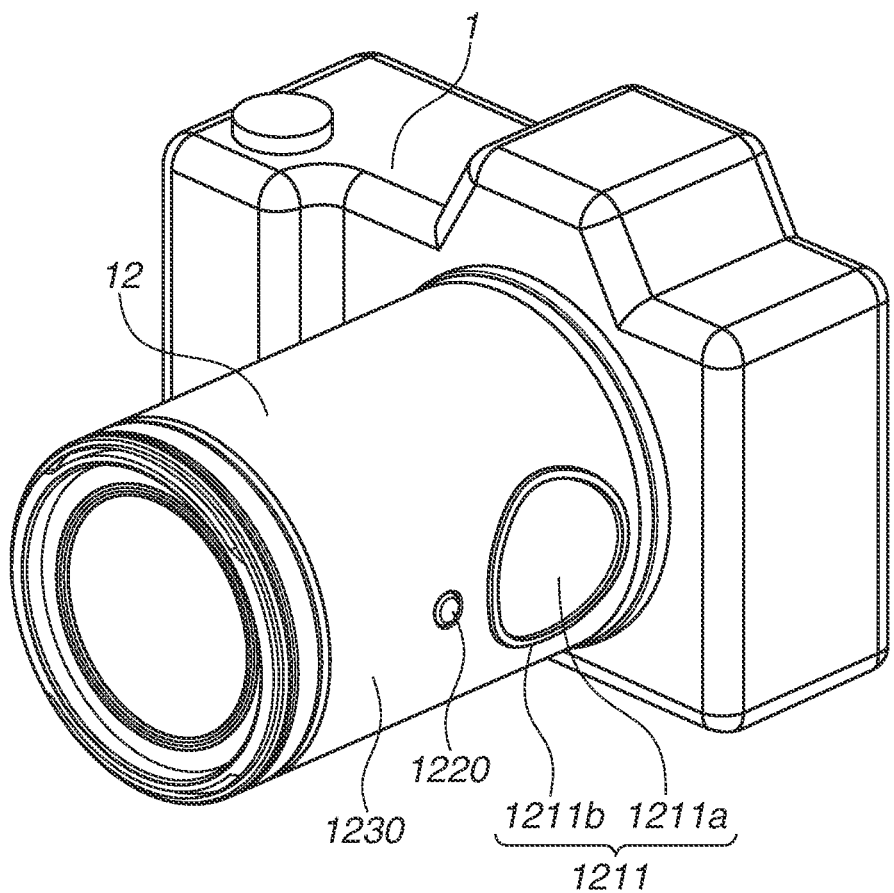
FIG. 1 is a perspective view of an imaging apparatus.

A configuration of a camera system (an imaging apparatus) will be described with reference to FIG. 1. The camera system includes a camera body 1 and a lens apparatus 12 as illustrated in FIG. 1. The lens apparatus 12 is an interchangeable lens attachable to and detachable from the camera body 1. The lens apparatus 12 does not be detachable from the camera body 1. The camera system illustrated in FIG. 1 can include a lens apparatus 22 described below instead of the lens apparatus 12. Configurations of the camera body 1 and the lens apparatus 12 will now be described.

(Configuration of Camera Body)

Figure 2:
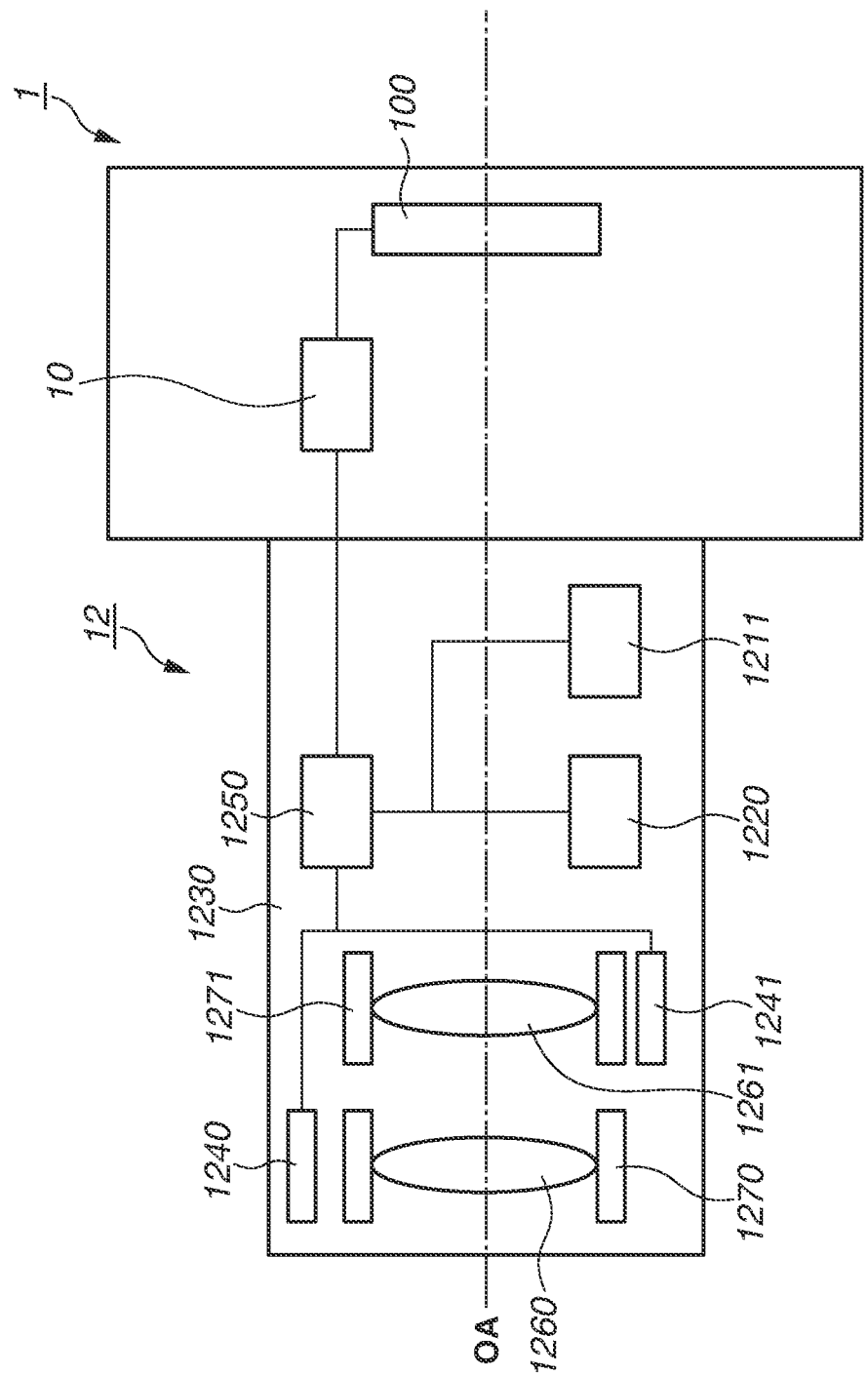
FIG. 2 is a block diagram illustrating a configuration of a lens apparatus and a camera body.

FIG. 2 is a block diagram illustrating a configuration of the camera body 1 and the lens apparatus 12. As illustrated in FIG. 2, the camera body 1 includes an image pickup element 100 and a camera side control unit 10. The image pickup element 100 is a photoelectric conversion element configured to receive an image formed by the lens apparatus 12 and to perform photoelectric conversion on light received from the lens apparatus 12. The camera side control unit 10 controls the image pickup element 100 and performs data communication with a lens side control unit 1250 described below.

(Configuration of Lens Apparatus)

As illustrated in FIG. 1, the lens apparatus 12 includes a lens barrel unit 1230 (an exterior unit incorporating a lens unit), a touch operation unit 1211 (an operation unit), and a switch button (a switch unit/a selection unit) 1220. As illustrated in FIG. 1, at least a part of the touch operation unit 1211 and at least a part of the switch button 1220 are located on the exterior portion of the lens barrel unit 1230 so that a user can operate these units. Shapes and functions of the touch operation unit 1211 and the switch button 1220 are described below.

As illustrated in FIG. 2, the lens apparatus 12 includes a focus lens unit (an optical element/a controlled unit) 1260, a focus lens unit holding frame 1270, and a focus lens unit driving unit (a driving unit) 1240. The lens apparatus 12 also includes a zoom lens unit (an optical element) 1261, a zoom lens unit holding frame 1271, and a zoom lens unit driving unit (a driving unit) 1241. The zoom lens unit in the present description is a single lens or an assembly of a plurality of lenses configured to move for zooming.

The focus lens unit holding frame 1270 is a cylindrical-shaped member configured to hold the focus lens unit 1260. The zoom lens unit holding frame 1271 is a cylindrical-shaped member configured to hold the zoom lens unit 1261. The focus lens unit driving unit 1240 is an actuator configured to move the focus lens unit 1260 and the focus lens unit holding frame 1270 in a direction of an optical axis OA. The zoom lens unit driving unit 1241 is an actuator configured to move the zoom lens unit 1261 and the zoom lens unit holding frame 1271 in the direction of the optical axis OA. The lens apparatus 12 can be a single focus lens that does not include the zoom lens unit 1261, the zoom lens unit holding frame 1271, and the zoom lens unit driving unit 1241.

The focus lens unit driving unit 1240 and the zoom lens unit driving unit 1241 both include members, such as a stepping motor, an ultrasonic motor, etc., configured to move each lens unit and each holding frame in the direction of the optical axis OA. The lens side control unit 1250 (a processing unit) is controlled based on a signal from the touch operation unit 1211 and the switch button 1220. Each driving unit is controlled by the lens side control unit 1250. In other words, each lens unit, each holding frame, each driving unit, the lens side control unit 1250, and the camera side control unit 10 can be controlled units controlled based on a touch operation via the touch operation unit 1211. The lens side control unit 1250 can control each driving unit based on a signal from the camera side control unit 10.

Figure 3:
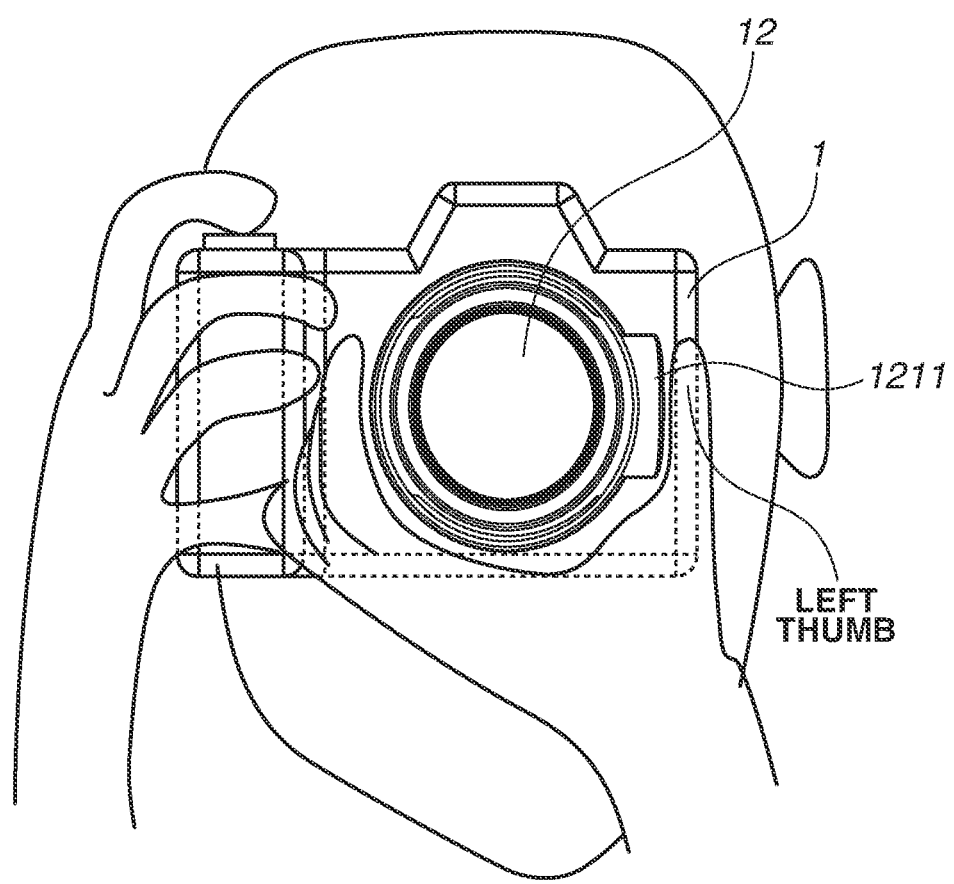
FIG. 3 illustrates how a user uses the imaging apparatus.

When a user holds the camera body 1 and the lens apparatus 12, the user typically holds the camera body 1 with the user's right hand and holds the lens apparatus 12 with the user's left hand as illustrated in FIG. 3. Thus, as illustrated in FIGS. 1 and 3, the touch operation unit 1211 is arranged on a left side of the lens apparatus 12 viewed from a side of the camera body 1, more specifically, a position easy for the user to touch with the user's left thumb.

(Configuration of Touch Operation Unit and Switch Button)

Figure 4:
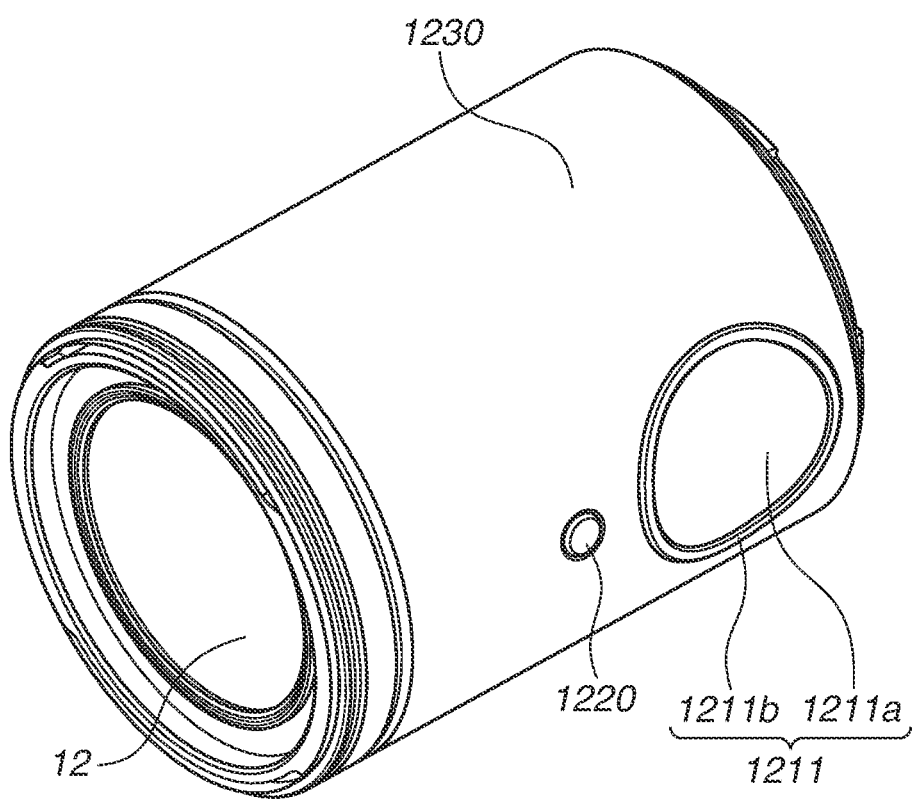
FIG. 4 is a perspective view of a lens apparatus according to a first exemplary embodiment.
Figure 5A:
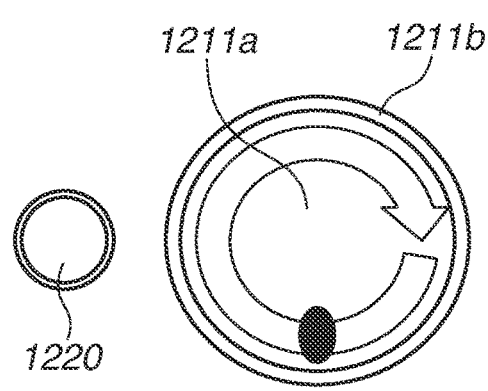
FIGS. 5A and 5B illustrate an operation unit according to the first exemplary embodiment.
Figure 5B:
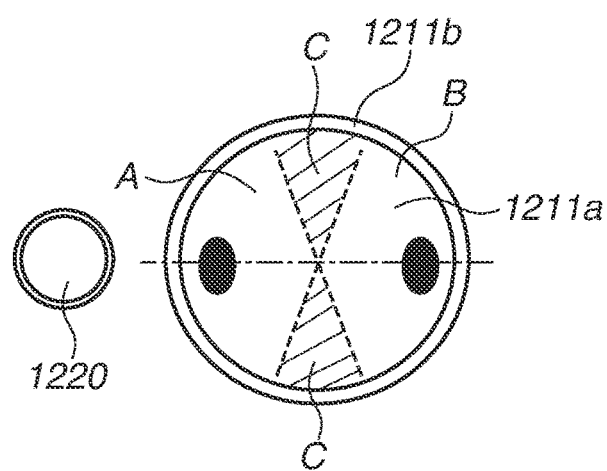
Figure 6:
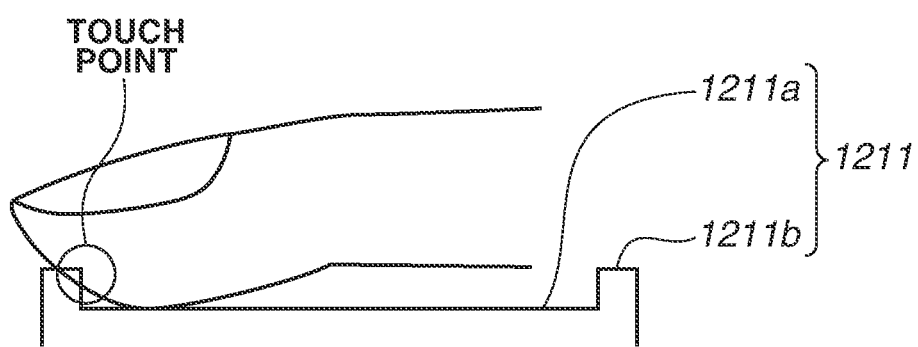
FIG. 6 illustrates an edge portion according to the first exemplary embodiment.

Shapes and functions of the touch operation unit 1211 and the switch button 1220 will now be described with reference to FIGS. 4, 5A, 5B, and 6. FIG. 4 is a diagram obtained by extracting only the lens apparatus 12 part from the diagram illustrated in FIG. 1. FIGS. 5A and 5B are diagrams obtained by extracting only the touch operation unit 1211 and the switch button 1220 parts from the diagram illustrated in FIG. 4. FIG. 5A illustrates a state in which focusing is performed. FIG. 5B illustrates a state in which zooming is performed. FIG. 6 illustrates an arrangement relationship between a detection unit 1211*a* and an edge portion 1211*b* described below.

As illustrated in FIG. 4, the touch operation unit 1211 includes the detection unit (a touch operation detection unit) 1211*a* and the edge portion 1211*b*. Types of the detection unit 1211*a* can include an electrostatic capacitance touch sensor or a pressure-sensitive touch sensor. The detection unit 1211*a* can detect a movement of a touch position of a user's finger on the detection unit 1211*a* and a position of the user's finger on the detection unit 1211*a*. The detection unit 1211*a* has a circular shape as illustrated in FIG. 4. The edge portion 1211*b* has a circular ring shape as illustrated in FIG. 6 and forms a convex step surrounding a periphery of the detection unit 1211*a*.

The shape of the detection unit 1211*a* is not limited to the circular shape and can be, for example, a round shape. The round shape can have a shape in which a circumference is gently curved without having an angle. Examples of this shape include a circular shape, an elliptical shape, a circular ring shape, and an elliptical ring shape.

The switch button 1220 can switch a type or an adjustment method of a parameter to be adjusted by the touch operation unit 1211. In other words, the switch button 1220 can switch the controlled unit to be controlled when the touch operation unit 1211 is operated. According to the present exemplary embodiment, the switch button 1220 can switch (select) a case where focusing (first control/first operation) is performed and a case where zooming (second control/second operation) is performed. When the switch button 1220 is used to switch to a mode for focusing, using the touch operation unit 1211 moves the focus lens unit 1260 in the direction of the optical axis OA. When the switch button 1220 is used to switch to a mode for zooming, using the touch operation unit 1211 moves the zoom lens unit 1261 in the direction of the optical axis OA.

(Case of Performing Focusing)

A case where focusing is performed will now be described with reference to FIG. 5A. If a user moves the user's finger on the detection unit 1211*a* from a touch position indicated by a black circle illustrated in FIG. 5A in a clockwise (a right hand turn) direction, the focus lens unit 1260 moves in a close range direction (first movement direction) by the focus lens unit driving unit 1240. If the user moves the user's finger in a counterclockwise (a left hand turn) direction, the focus lens unit 1260 moves in an infinite direction (second movement direction different from the first movement direction) by the focus lens unit driving unit 1240.

In another case, whether a movement speed of the user's finger on the detection unit 1211*a* is a predetermined speed or more is considered. In this case, the focus lens unit 1260 moves, by an operation for one round, at a speed (first movement speed) at which the focus lens unit 1260 can move, within a movable range, from an end portion on a close range side to an end portion on an infinite side. In another case, whether the movement speed of the user's finger on the detection unit 1211*a* is less than the predetermined speed is considered. In this case, the focus lens unit 1260 moves, by operations for four rounds, at a speed (second movement speed lower than the first movement speed) at which the focus lens unit 1260 can move, within the movable range, from the end portion on the close range side to the end portion on the infinite side. In other words, a movement speed of the focus lens unit 1260 can be changed depending on an operation speed by the user.

As described above, in the lens apparatus 12 according to the present exemplary embodiment, in a case where a movement amount of the focus lens unit 1260 does not reach a user's target amount by the operation for one round, the user can continue the operation while keeping the user's finger on the detection unit 1211*a*. The lens apparatus 12 according to the present exemplary embodiment can thereby reduce an operation burden on a user as compared with the lens apparatus discussed in the above-described Japanese Patent Application Laid-Open No. 2009-169266. The lens apparatus 12 according to the present exemplary embodiment can also provide an effect of reducing an operation burden in a case where zooming is performed as described below. In a case where focusing is performed, a controlled unit to be controlled according to a result of a touch operation on the touch operation unit 1211 is the lens side control unit 1250 or the focus lens unit driving unit 1240.

(Case of Performing Zooming)

A case where zooming is performed is described with reference to FIG. 5B. A case is considered in which a user touches a region A (first region/first detection region) on the detection unit 1211*a* with the user's finger. In other words, a case in which the user's finger touches the detection unit 1211*a* at a touch position illustrated by a black circle on a left side illustrated in FIG. 5B. In this case, the zoom lens unit 1261 moves to a telephoto end side (third movement direction) by the zoom lens unit driving unit 1241. A case is also considered in which the user touches a region B (second region/second detection region) on the detection unit 1211*a* with the user's finger. In other words, a case is considered in which the user's finger touches the detection unit 1211*a* at the touch position illustrated by the black circle on a right side illustrated in FIG. 5B. In this case, the zoom lens unit 1261 moves to a wide-angle end side (fourth movement direction) by the zoom lens unit driving unit 1241. When the user's finger is removed from the detection unit 1211a, the zoom lens unit driving unit 1241 stops, and the zoom lens unit 1261 also stops. When the zoom lens unit 1261 reaches a wide-angle end or a telephoto end, or approaches near each end, the zoom lens unit driving unit 1241 stops, and the zoom lens unit 1261 also stops.

In the region A illustrated in FIG. 5B, zooming performs at a high speed (first movement speed) in a case where a user's finger touches a region on an upper side (one side) of an alternate long and short dash line. Zooming also performs at a low speed (second movement speed) in a case where the user's finger touches a region on a lower side (another side) of the alternate long and short dash line. The same applies to the region B. By enabling the lens apparatus 12 to perform zooming at a high speed or a low speed, the user can set a target angle of view accurately in a short time. Examples of zooming performance include performing rough adjustment with high speed zooming at first, and then performing fine adjustment with low speed zooming. The alternate long and short dash line illustrated in FIG. 5B is a line (reference line) that is parallel to the optical axis of the lens apparatus 12 and passes through a center of the detection unit 1211a.

Regions C (third regions/non-detection regions) indicated by oblique lines and dashed lines between the region A and the region B are non-sensitive regions. The zoom lens unit driving unit 1241 is set not to drive even if a user's finger touches the region C. This setting enables preventing erroneous operations by a user.

As described above, according to lens apparatus 12 of the present exemplary embodiment, a user only has to keep the user's finger on the region A or the region B until the target angle of view is reached. The lens apparatus 12 according to the present exemplary embodiment can accordingly reduce an operation burden on a user as compared with the lens apparatus discussed in the above-described Japanese Patent Application Laid-Open No. 2009-169266. In a case where zooming is performed, a controlled unit to be controlled based on a result of a touch operation on the touch operation unit 1211 is the lens side control unit 1250 or the zoom lens unit driving unit 1241.

Zooming can be performed in a case where a touch operation indicated in FIG. 5A is detected, and focusing can be performed in a case where a touch operation indicated in FIG. 5B is detected.

(Function of Switch Button)

When switch button 1220 is pressed, focusing and zooming are switched. According to the present exemplary embodiment, the lens apparatus 12 includes the switch button 1220, but the switch button 1220 can be included on the camera body 1 instead of in the lens apparatus 12. Alternatively, focusing and zooming can be switched on a setting screen on a display provided on a back surface of the camera body 1. In this case, the setting screen can be configured to perform switching of focusing and zooming as well as switching of high speed zooming and low speed zooming.

(Function of Edge Portion)

The edge portion 1211b will be described with reference to FIG. 6. The touch operation unit 1211 includes the edge portion (convex portion) 1211b (convex shape) that is formed to surround the periphery of the detection unit 1211a and is higher than the detection unit 1211a. The edge portion 1211b is located on the periphery of the detection unit 1211a, so that a user can recognize a position of the edge portion 1211b and a position of the detection unit 1211a based on tactile sensation. Thus, even in a case, for example, where a user cannot visually confirm the detection unit 1211a while looking through a finder (not illustrated) of the camera body 1, the user can intuitively recognize the position of the detection unit 1211a. Thus, the user can intuitively perform a touch operation for the above described focusing and zooming on the detection unit 1211a.

Even in a case where a user cannot visually confirm the detection unit 1211a, the user can smoothly perform a drag operation for drawing a circle by performing an operation for moving a touch position while tracing the edge portion 1211b (drag operation).

Figure 7:
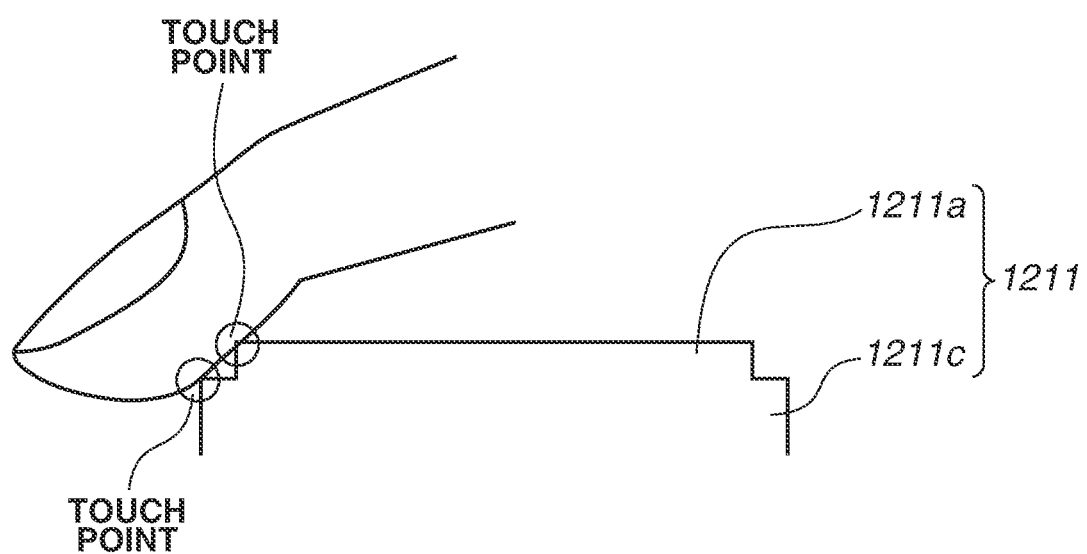
FIG. 7 illustrates a modification of the edge portion according to the first exemplary embodiment.

Instead of using the edge portion 1211b, a stepped portion 1211c (concave shape) can be provided around the detection unit 1211a as illustrated in FIG. 7. The stepped portion 1211c is formed around the detection unit 1211a such that the stepped portion 1211c is lower than the detection unit 1211a. The stepped portion 1211c can perform a function similar to that of the edge portion 1211b.

The lens apparatus 22 according to a second exemplary embodiment will be described with reference to FIGS. 8 to 12. Differences between the lens apparatus 12 according to the above-described first exemplary embodiment and the lens apparatus 22 according to the second exemplary embodiment are a configuration of a detection unit 2221a and arrangement of a switch button 2220. The switch button 2220 can be arranged on an object side of the detection unit 2221a as with the switch button 1220 as in the first exemplary embodiment.

(Configuration of Touch Operation Unit and Switch Button)

Figure 8:
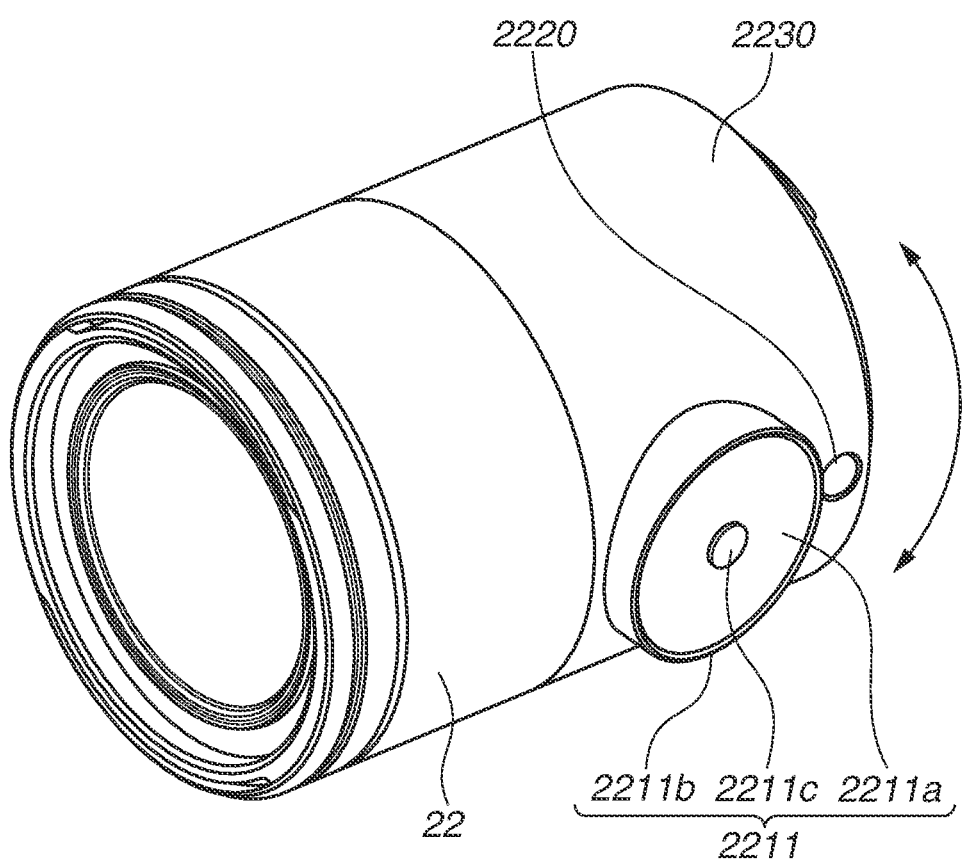
FIG. 8 is a perspective view of a lens apparatus according to a second exemplary embodiment.
Figure 9:
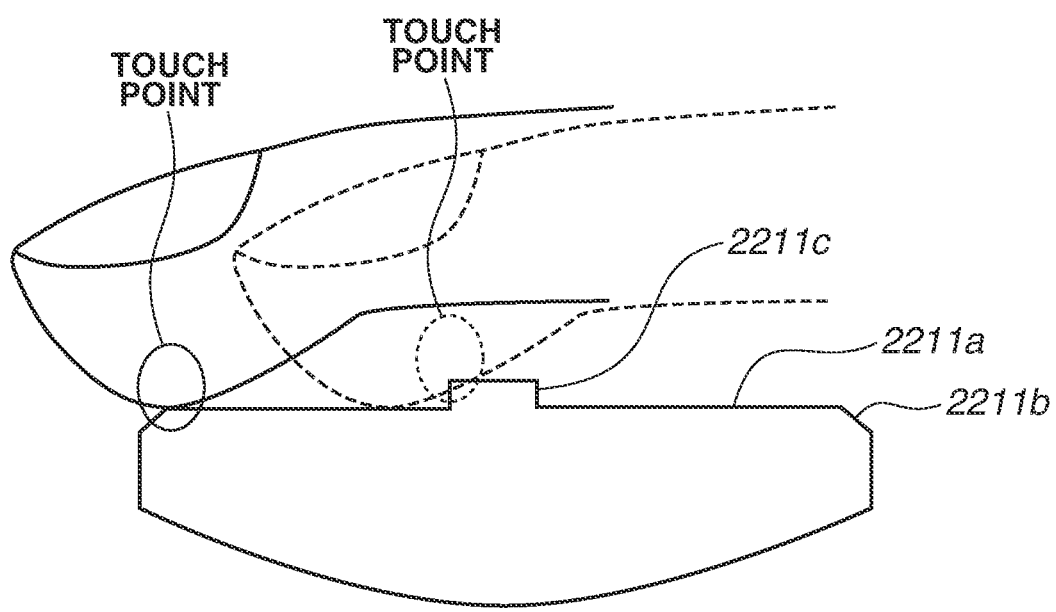
FIG. 9 illustrates an edge portion according to the second exemplary embodiment.

As illustrated in FIG. 8, the lens apparatus 22 includes a lens barrel unit 2230, a touch operation unit 2211, and the switch button 2220. As illustrated in FIG. 8, at least parts of the touch operation unit 2211 and the switch button 2220 are located on the exterior of the lens barrel unit 2230 so that a user can operate them. The touch operation unit 2211 includes a detection unit 2211a having a circular ring shape, an edge portion 2211b, and a protrusion portion 2211c. As illustrated in FIG. 9, the protrusion portion 2211c is located within the touch operation unit 2211. The protrusion portion 2211c is a cylindrical portion projecting from a center portion of the detection unit 2211a having a circular ring shape. The edge portion 2211b includes an inclined surface portion (a surface inclined with respect to the touch operation unit 2211) provided on a periphery of the detection unit 2211a.

A user can recognize positions of the protrusion portion 2211c and the edge portion 2211b based on tactile sensation, and can thus recognize a position of the detection unit 2211a. Since the protrusion portion 2211c and the edge portion 2211b have different shapes, a user can intuitively recognize whether the user touches a vicinity of the center or the periphery of the detection unit 2211a based on a difference in tactile sensation. Even in a case where a user cannot visually confirm the detection unit 2211a, for example, while looking through a finder of the camera body 1, the user can intuitively recognize the position of the detection unit 2211a and can intuitively perform a touch operation described below on the detection unit 2211a.

The detection unit 2211a can detect a movement in a circumferential direction of a touch position (black circle illustrated in FIG. 10) of a user's finger on the detection unit 2211a and a position of the user's finger on the detection unit 2211a. The detection unit 2211a includes a region D (fourth region,/fourth detection region) and a region E (fifth region/fifth detection region). The region D is a region outside of a dashed line circle illustrated in FIG. 10. The region E is a region inside the dashed line circle illustrated in FIG. 10.

If the switch button 2220 is pressed, an operation performed when a touch operation is performed on the detection unit 2211a can be switched in an order of focusing, zooming, and adjustment of an automatic focus (AF) point. A touch operation in a case where focusing is performed will now be described.

(Case of Performing Focusing)

Figure 10:
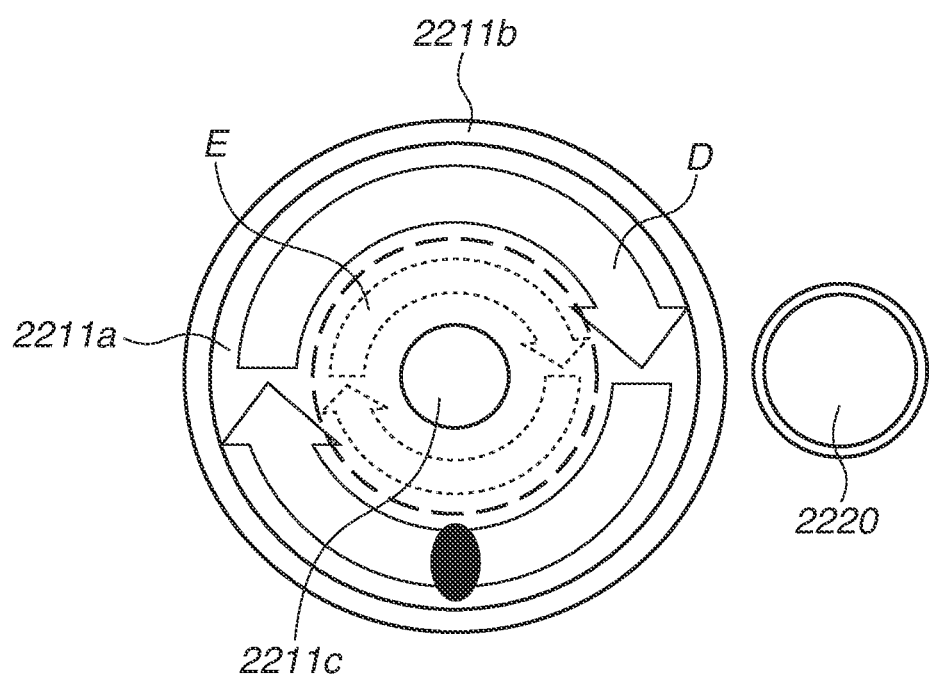
FIG. 10 illustrates an operation unit according to the second exemplary embodiment.

If a user moves the user's finger from the touch position indicated by the black circle in FIG. 10 in a clockwise (the right hand turn) direction on the detection unit 2211a, the focus lens unit 1260 moves in a close range direction by the focus lens unit driving unit 1240. If the user moves the user's finger in a counterclockwise (the left hand turn) direction, the focus lens unit 1260 moves in an infinite direction by the focus lens unit driving unit 1240.

As described above, according to the lens apparatus 22 of the present exemplary embodiment, in a case where a movement amount of the focus lens unit 1260 does not reach a user's target amount by the operation for one round, the user can continue the operation while keeping the user's finger on the detection unit 2211a. The lens apparatus 22 according to the present exemplary embodiment can reduce an operation burden on a user as compared with the lens apparatus discussed in the above-described Japanese Patent Application Laid-Open No. 2009-169266. The lens apparatus 22 according to the present exemplary embodiment can also provide an effect of reducing an operation burden in a case where zooming is performed as described below.

If a touch operation for drawing a circle is performed in the region D, the focus lens unit 1260 moves, at a speed at which the focus lens unit 1260 can move, from the end portion on the close range side to the end portion on the infinite side within the movable range by operations for four rounds. If a touch operation for drawing a circle is performed in the region E, the focus lens unit 1260 moves, at a speed at which the focus lens unit 1260 can move, from the end portion on the close range side to the end portion on the infinite side within the movable range by an operation for one round. In other words, in the region D, focusing performs at a low speed (first movement speed) by a touch operation. In the region E, focusing performs at a high speed (second movement speed) by a touch operation. The region D can be a region for high speed focusing, and the region E can be a region for low speed focusing. The region D on an outer side of the region E has a longer circumferential length, and thus it is suitable to use the region D as the region for low speed focusing for finer focusing. A user can set the movement speed of the focus lens unit 1260 when a touch operation occurs in the region D and the region E.

(Case of Performing Zooming)

Pressing the switch button 2220 can result in switching an operation performed when a touch operation occurs on the detection unit 2211a from focusing to zooming. After switching from focusing to zooming, if a user moves the user's finger from the touch position indicated by the black circle illustrated in FIG. 10 in a clockwise (the right hand turn) direction on the detection unit 2211a, the zoom lens unit 1261 moves to the wide-angle end side driven by the zoom lens unit driving unit 1241. If the user moves the user's finger in a counterclockwise (the left hand turn) direction, the zoom lens unit 1261 moves to the telephoto end side driven by the zoom lens unit driving unit 1241. Even in a zooming operation similar to the focusing operation, the regions D and E can be separately used for low speed zooming function and high speed zooming function, respectively.

If the user's finger moves away from the detection unit 2211a, the zoom lens unit driving unit 1241 stops, and the zoom lens unit 1261 stops. In a case where the zoom lens unit 1261 reaches the wide-angle end or the telephoto end, or approaches near each end, the zoom lens unit driving unit 1241 stops and the zoom lens unit 1261 stops.

As described above, according to the lens apparatus 22 of the present exemplary embodiment, a user can continue a touch operation for drawing a circle without removing the user's finger from the region D or the region E until the target angle of view is reached. The lens apparatus 22 according to the present exemplary embodiment can reduce an operation burden on a user as compared with the lens apparatus discussed in the above-described Japanese Patent Application Laid-Open No. 2009-169266.

(Case of Adjusting AF Point)

Figure 11A:
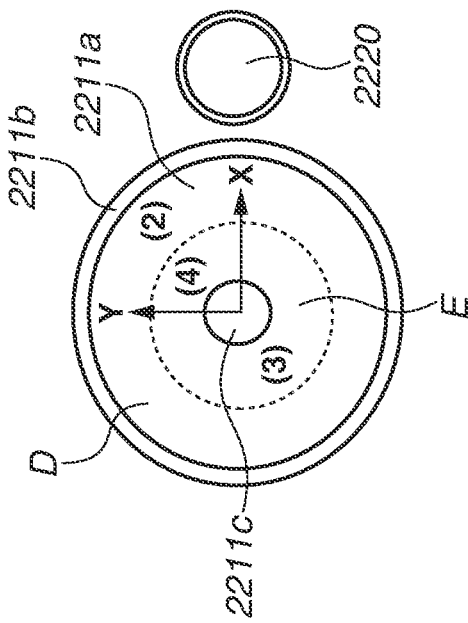
FIGS. 11A and 11B illustrate an operation for adjusting an automatic focus (AF) point according to the second exemplary embodiment.

Pressing the switch button 2220 can result in switching an operation performed when a touch operation occurs on the detection unit 2211a from zooming to adjustment of an automatic focus (AF) point (focus point). FIG. 11A is an example of an image viewed by a user. An initial position of the AF point is a position (1) illustrated in FIG. 11A. In a case where the user intends to focus on an upper right region of the image in FIG. 11A, an operation of moving the AF point from the position (1) to a position (2) is required. By touching the detection unit 2211a, the user can adjust the AF point. In other words, the user can change (set) a focusing region in an image (captured image) formed by the lens apparatus 22. At least the lens side control unit 1250 or the camera side control unit 10 can function as a processing unit for performing the above-described setting.

Figure 11B:
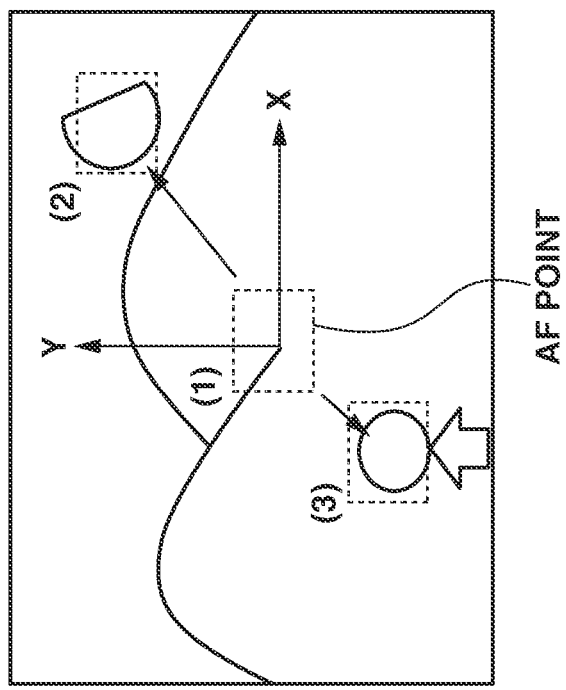

The X-axis and Y-axis illustrated in FIG. 11A correspond to the X-axis and Y-axis illustrated in FIG. 11B, respectively. If the user continues to touch the position (2) illustrated in FIG. 11B, the AF point moves in a direction from the position (1) to the position (2). If the user removes the user's finger from the position (2), the AF point stops at this position. Similarly, if the user continues to touch a position (3) illustrated in FIG. 11B, the AF point moves in a direction from the position (1) to the position (3). If the user removes the user's finger from the position (3), the AF point stops at this position.

In a case where the user continues to touch a position (4) illustrated in FIG. 11B, the AF point moves in a direction from the position (1) to the position (2). The movement speed at this time is faster than a speed occurring in a case where the user continues to touch the position (2). In other words, the regions D and E can be selectively used based on whether the AF point is adjusted at a low speed or a high speed. In a case where the AF point is adjusted, the controlled unit to be controlled based on a result of a touch operation on the touch operation unit 1211 is the camera side control unit 10.

Figure 12:
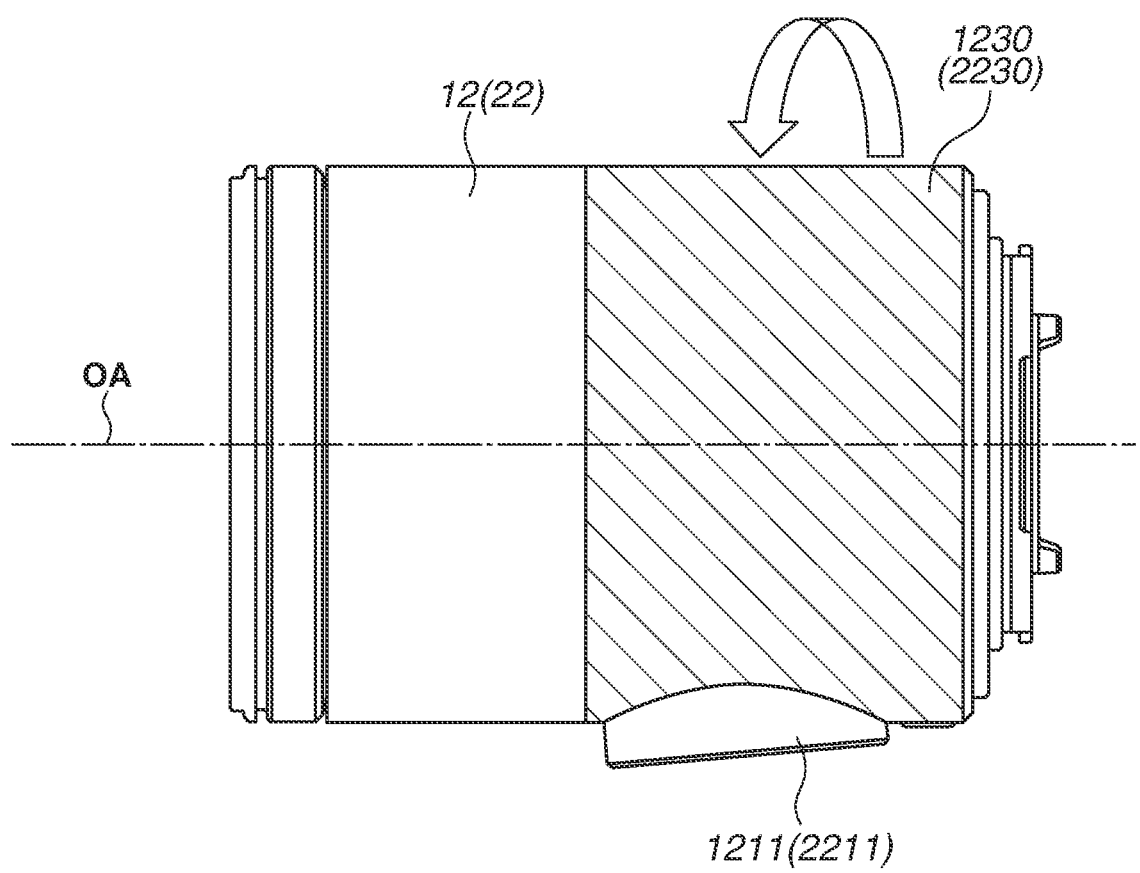
FIG. 12 illustrates a lens apparatus according to a modification.

In the lens apparatus 12 according to the first exemplary embodiment or in the lens apparatus 22 according to the second exemplary embodiment, the detection unit is arranged in parallel with the optical axis of the lens apparatus. This configuration of the detection unit is not seen to be limiting. For example, the detection unit can be inclined with respect to the optical axis OA of the lens apparatus as illustrated in FIG. 12. In FIG. 12, the detection unit is inclined such that an object side portion of the detection unit is further separated from the optical axis OA than an image side portion when the detection unit is viewed from a direction perpendicular to the optical axis OA. This configuration facilitates a user to perform a touch operation on the detection unit using the user's left thumb.

A shaded portion in the lens barrel unit 1230/2230 illustrated in FIG. 12 (a portion provided with the touch operation unit or the detection unit) can be rotatable about the optical axis OA (with the optical axis OA as a center). When the portion provided with the detection unit in the lens barrel unit 1230/2230 rotates, a position of the detection unit can be adjusted in a circumferential direction of the lens barrel unit 1230/2230. The detection unit can accordingly be placed at a position where a user can easily operate it.

Figure 13:
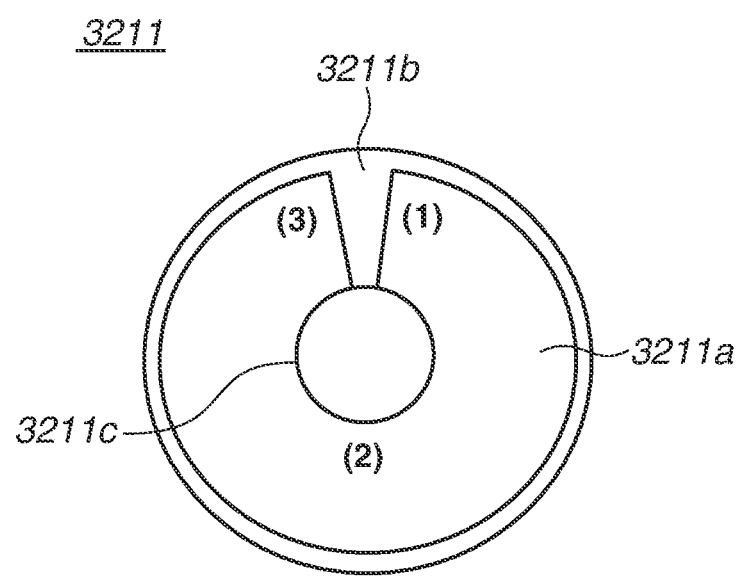
FIG. 13 illustrates an operation unit according to the modification.

According to the first and the second exemplary embodiments, the detection unit has a circular shape or a circular ring shape. The shape of the detection unit is not limited to these shapes. The detection unit can have, for example, a circular arc shape partially notched as illustrated in FIG. 13. A touch operation unit 3211 illustrated in FIG. 13 includes a detection unit 3211a, an edge portion 3211b, and a protrusion portion 3211c. The edge portion 3211b and the protrusion portion 3211c have the similar shapes as those of the edge portion 2211b and the protrusion portion 2211c according to the second exemplary embodiment. A pressure-sensitive (a resistive) touch sensor has an end portion where a touch operation cannot be detected. In a case where a pressure-sensitive touch sensor is used, it is suitable that the detection unit has a circular arc shape partially notched as illustrated in FIG. 13.

If a user touches a position (1) illustrated in FIG. 13, the focus lens unit 1260 moves to the end portion on the close range side within a movable range. In a case where the user touches a position (3), the focus lens unit 1260 moves to the end portion on the infinite side within the movable range. If the user touches a position (2), the focus lens unit 1260 moves to a center of the movable range. As described above, a user can instruct, via a touch operation, the position of the focus lens unit 1260 by using the detection unit having a partially notched shape. Even in a zooming case, the positions (1), (2), and (3) illustrated in FIG. 13 can be similarly assigned to positions at the wide-angle end, the middle, and the telephoto end, respectively.

Unlike the touch operation unit according to each of the above-described exemplary embodiments, a touch operation of drawing a circle of 360 degrees or more cannot be performed on the touch operation unit 3211 illustrated in FIG. 13. In a case where a position is specified by a touch operation like the positions (1), (2), and (3) described above, it is desirable to have a circular arc shape partially notched like the touch operation unit 3211. Even if the touch operation unit 3211 has a rectangle shape extending in the optical axis direction of the lens apparatus, a position can be specified by using a touch operation. The circular arc shape like the touch operation unit 3211 can reduce a width of the touch operation unit in the optical axis direction.

According to the first exemplary embodiment, the touch operation unit can perform focusing and zooming. According to the second exemplary embodiment, the touch operation unit can perform focusing, zooming, and AF point adjustment. An operation performed by operating the touch operation unit and a parameter adjusted by the touch operation unit are not limited to focusing, zooming, and AF point adjustment. The touch operation unit can adjust a continuous parameter, such as a shutter speed, an International Organization for Standardization (ISO) sensitivity, an aperture value, and an exposure correction value. The touch operation unit can adjust, for example, a trimming position of a captured image, and a direction and a speed in power focus mode.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2019-164298, filed Sep. 10, 2019, which is hereby incorporated by reference herein in its entirety.

What is claimed is:

1. A lens apparatus comprising:
    an exterior unit incorporating a lens unit having an optical axis;
    an operation unit which is arranged on the exterior unit and on which a touch operation is to be performed to control at least one controlled unit; and
    an edge portion that surrounds a periphery of the operation unit,
    wherein the operation unit is configured to detect a clockwise touch operation and a counterclockwise touch operation around an axis extending in a direction intersecting with the optical axis of the lens unit.
2. The lens apparatus according to claim 1, wherein the edge portion has a convex shape or a concave shape with respect to the operation unit.
3. The lens apparatus according to claim 1, wherein the edge portion includes a surface inclined with respect to the operation unit.
4. The lens apparatus according to claim 1,
    wherein the operation unit has a circular ring shape, and
    wherein the operation unit includes a protrusion portion located inside the circular ring shape of the operation unit.
5. The lens apparatus according to claim 1, further comprising at least one driving unit configured to move the at least one controlled unit,
    wherein the at least one controlled unit is at least one optical element, and wherein the at least one optical element is configured to move in at least one direction.
6. The lens apparatus according to claim 5,
    wherein the clockwise touch operation results in an optical element from the at least one optical element moving in a first movement direction, and
    wherein the counterclockwise touch operation results in the optical element from the at least one optical element moving in a second movement direction different from the first movement direction.
7. The lens apparatus according to claim 5,
    wherein, in a first case where a speed of the touch operation is greater than or equal to a predetermined speed, the speed of the touch operation results in a first movement speed of an optical element from the at least one optical element, and
    wherein, in a second case where the speed of the touch operation is less than the predetermined speed, the speed of the touch operation results in a second movement speed, lower than the first movement speed, of the optical element from the at least one optical element.
8. The lens apparatus according to claim 5,
    wherein the operation unit includes at least one detection region,
    wherein a detection region, from the at least one detection region, corresponds to moving an optical element from the at least one optical element in a third movement direction, and wherein a detection region, from the at least one detection region, corresponds to moving the optical element from the at least one optical element in a fourth movement direction different from the third movement direction.

9. The lens apparatus according to claim 5,
wherein a line parallel to an optical axis of the lens apparatus and passes through a center of the operation unit is a reference line,
wherein one side with respect to the reference line corresponds to a first movement speed of an optical element of the at least one optical element, and
wherein another side with respect to the reference line corresponds to a second movement speed of an optical element from the at least one optical element.

10. The lens apparatus according to claim 5,
wherein a detection region, from at least one detection region, corresponds to a first movement speed of an optical element from the at least one optical element, and
wherein a detection region, from the at least one detection region, corresponds to a second movement speed of the optical element from the at least one optical element.

11. The lens apparatus according to claim 10,
wherein the detection region corresponding to the first movement speed is located outside the detection region corresponding to the second movement speed, and
wherein the first movement speed is lower than the second movement speed.

12. The lens apparatus according to claim 1, further comprising a selection unit configured to select at least one of the at least one controlled unit to be controlled based on the touch operation.

13. The lens apparatus according to claim 1, wherein the operation unit is rotatable about an optical axis of the lens apparatus.

14. An imaging apparatus comprising:
a lens apparatus; and
an image pickup element configured to receive an image formed by the lens apparatus,
wherein the lens apparatus includes:
an exterior unit incorporating a lens unit having an optical axis,
an operation unit which is arranged on the exterior unit and on which a touch operation is to be performed to control at least one controlled unit, and
an edge portion that surrounds a periphery of the operation unit,
wherein the operation unit is configured to detect a clockwise touch operation and a counterclockwise touch operation around an axis extending in a direction intersecting with the optical axis of the lens unit.

15. The imaging apparatus according to claim 14 wherein the at least one controlled unit includes a processing unit configured to set a focusing region in the image.

16. A lens apparatus comprising:
an exterior unit incorporating a lens unit;
an operation unit which is arranged on the exterior unit and on which a touch operation is to be performed to control at least one controlled unit; and
an edge portion that surrounds a periphery of the operation unit,
wherein the operation unit has a round shape and includes a detection unit configured to detect a clockwise touch operation and a counterclockwise touch operation.

17. An imaging apparatus comprising:
a lens apparatus; and
an image pickup element configured to receive an image formed by the lens apparatus,
wherein the lens apparatus includes:
an exterior unit incorporating a lens unit,
an operation unit which is arranged on the exterior unit and on which a touch operation is to be performed to control at least one controlled unit, and
an edge portion that surrounds a periphery of the operation unit,
wherein the operation unit has a round shape and includes a detection unit configured to detect a clockwise touch operation and a counterclockwise touch operation.

* * * * *